United States Patent
Teshima et al.

(10) Patent No.: US 7,638,027 B2
(45) Date of Patent: Dec. 29, 2009

(54) MICROSTRUCTURE ARRAY, MOLD FOR FORMING A MICROSTRUCTURE ARRAY, AND METHOD OF FABRICATING THE SAME

(75) Inventors: Takayuki Teshima, Kanagawa (JP); Takayuki Yagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 706 days.

(21) Appl. No.: 11/063,643

(22) Filed: Feb. 24, 2005

(65) Prior Publication Data

US 2005/0157396 A1 Jul. 21, 2005

Related U.S. Application Data

(62) Division of application No. 09/971,662, filed on Oct. 9, 2001, now abandoned.

(30) Foreign Application Priority Data

Oct. 10, 2000 (JP) ............................. 2000-308687
Oct. 10, 2000 (JP) ............................. 2000-308688

(51) Int. Cl.
    *C25D 1/00* (2006.01)
(52) U.S. Cl. .......................................... 205/79; 205/70
(58) Field of Classification Search .................. 205/70, 205/79, 122, 126; 264/2.5, 1.7; 249/119, 249/134, 135
    See application file for complete search history.

(56) References Cited

U.S. PATENT DOCUMENTS

| | | | |
|---|---|---|---|
| 3,801,183 A | 4/1974 | Sevelin et al. | 359/537 |
| 4,099,838 A | 7/1978 | Cook et al. | 359/537 |
| 4,511,210 A | 4/1985 | Tung et al. | 359/541 |
| 4,688,894 A | 8/1987 | Hockert | 359/537 |
| 4,691,993 A | 9/1987 | Porter et al. | 359/537 |
| 4,968,063 A | 11/1990 | McConville et al. | 283/72 |
| 5,225,935 A | 7/1993 | Watanabe et al. | 359/619 |
| 5,254,390 A | 10/1993 | Lu | 428/156 |
| 5,536,455 A | 7/1996 | Aoyama et al. | 264/1.7 |
| 5,670,096 A | 9/1997 | Lu | 264/1.1 |
| 5,850,276 A * | 12/1998 | Ochi et al. | 349/158 |
| 6,632,342 B1 * | 10/2003 | Teshima et al. | 205/118 |
| 6,653,705 B2 | 11/2003 | Ushijima et al. | 257/432 |
| 6,656,393 B2 | 12/2003 | Yagi et al. | 264/2.5 |

FOREIGN PATENT DOCUMENTS

EP     0 976 530 A2    2/2000

(Continued)

OTHER PUBLICATIONS

Daly et al., The Manufacture of Microlenses by Melting Photoresist, Meas. Sci Technol. 1, 1990, 759-766.*

(Continued)

*Primary Examiner*—Nam X Nguyen
*Assistant Examiner*—Luan V Van
(74) *Attorney, Agent, or Firm*—Fitzpatrick, Cella, Harper & Scinto

(57) ABSTRACT

A method for fabricating a microstructure array, such as a microlens array, and a mold for forming the microlens array, includes the steps of forming an array of microstructures with a curved profile in a discrete form on a substrate, and uniformly forming a continuous layer on the substrate and the discrete microstructures. Optically-unusable regions between the discrete microstructures, such as microlenses, can be readily reduced or eliminated by forming the continuous layer until flat portions between the microstructures disappear.

20 Claims, 6 Drawing Sheets

FOREIGN PATENT DOCUMENTS

| | | |
|---|---|---|
| EP | 1041407 A1 | 10/2000 |
| JP | 1-261601 | 10/1989 |
| JP | 5-303009 | 11/1993 |
| JP | 7-072808 | 3/1995 |
| JP | 07263402 A * | 10/1995 |
| JP | 8-136704 | 5/1996 |
| JP | 09258003 A * | 10/1997 |

OTHER PUBLICATIONS

Masahiro Oikawa, et al., "A Distributed-Index Planar Micro-Lens Made of Plastics", *Japanese Journal of Applied Physics*, vol. 20, No. 1, pp. L51-L54, Jan. 1981.

D. Daly, et al., "The Manufacture of Microlenses By Melting Photoresist", *Microlens Arrays* (Teddington), pp. 23-34, May 1991.

* cited by examiner

MICROSTRUCTURE ARRAY, MOLD FOR FORMING A MICROSTRUCTURE ARRAY, AND METHOD OF FABRICATING THE SAME

This application is a division of application Ser. No. 09/971,662 filed Oct. 9, 2001.

BACKGROUND OF THE INVENTION

1. Field of the Invention

This invention relates to a microstructure array, such as a microlens array that is usable in the field of optoelectronics and the like, a mold or a master of a mold (in the specification the term "mold" is chiefly used in the broad sense including both a mold and a master of a mold) for forming a microstructure array, a fabrication method of the microstructure array, and so forth.

2. Description of the Related Background Art

A microlens array typically has a structure of arrayed minute lenses each having a diameter from about 2 to 3 microns to about 200 or 300 microns and an approximately spherical profile. The microlens array is usable in a variety of applications, such as liquid-crystal display devices, light receivers and interfiber connections in optical communication systems.

Meanwhile, earnest developments have been made to develop a surface emitting laser and the like that can be readily arranged in an array form at narrow pitches between the devices. Accordingly, there exists a significant need for a microlens array with narrow lens intervals and a large numerical aperture (NA).

Likewise, a light receiving device, such as a charge coupled device (CCD), has been increasingly downsized as semiconductor processing techniques develop and advance. Therefore, also in this field, the need for a microlens array with narrow lens intervals and a large NA is increasing. In the field of such a microlens, a desirable structure is a microlens with a large light-condensing efficiency that can highly efficiently utilize light incident on its lens surface.

Further, similar needs exist in prospective fields of optical information processing, such as optical parallel processing-operations and optical interconnections.

Furthermore, display devices of active or self-radiating types, such as electroluminescent (EL) panels, have been enthusiastically studied and developed, and a highly-defined and highly-luminous display has been thus proposed. In such a display, there is a heightened need for a microlens array that can be produced at a relatively low cost and with a large area, as well as with a small lens size and a large NA.

There are presently a number of conventional methods for fabricating microlenses. In a conventional microlens-array fabrication method using an ion exchange method (see M. Oikawa, et al., Jpn. J. Appl. Phys. 20(1) L51-54, 1981), the refractive index is increased at plural locations in a substrate of multi-component glass by using an ion exchange method. A plurality of lenses are thus formed at high-refractive index locations. In this method, however, the lens diameter cannot be large, compared with intervals between lenses. Hence, it is difficult to design a lens with a large NA.

Further, the fabrication of a large-area microlens array is not easy, since a large scale manufacturing apparatus, such as an ion diffusion apparatus, is required to produce such a microlens array. Moreover, an ion exchange process is needed for each glass, in contrast with a molding method using a mold. Therefore, variations of lens quality, such as a focal length, are likely to increase between lots unless the management of fabrication conditions in the manufacturing apparatus is carefully conducted. In addition to the above, the cost of this method is relatively high, as compared with the method using a mold.

Further, in the ion exchange method, alkaline ions for ion-exchange are indispensable in a glass substrate, and therefore, the material of the substrate is limited to alkaline glass. The alkaline glass is, however, unfit for a semiconductor-based device which needs to be free of alkaline ions. Furthermore, since the thermal expansion coefficient of the glass substrate greatly differs from that of a substrate of a light radiating or receiving device, misalignment between the microlens array and the devices is likely to occur due to a mismatch between their thermal expansion coefficients as the integration density of the devices increases.

Moreover, a compressive strain inherently remains on the glass surface which is processed by the ion exchange method. Accordingly, the glass tends to warp, and hence, the difficulty in joining or bonding between the glass and the light radiating or receiving device increases as the size of the microlens array increases.

In another conventional method, an original plate of a microlens is fabricated, lens material is deposited on the original plate and the deposited lens material is then separated. The original plate or mold is fabricated by an electron-beam lithography method (see Japanese Patent Application Laid-Open No. 1(1989)-261601), or a wet etching method (see Japanese Patent Application Laid-Open No. 5(1993)-303009). In these methods, the microlens can be reproduced by molding, variations between lots are unlikely to occur, and the microlens can be fabricated at a low cost. Further, the problems of alignment error and warping due to the difference in the thermal expansion coefficient can be solved, in contrast with the ion exchange method. In the electron-beam lithography method, however, an electron-beam lithographic apparatus is expensive and a large investment in equipment is needed. Further, it is difficult to fabricate a mold having a large area more than 100 cm$^2$ (10 cm-square) because the electron beam impact area is limited.

In another conventional method, a mask layer with serially or two-dimensionally arranged openings is formed on a mother substrate, and etching is performed through the openings (see Japanese Patent Application Laid-Open No. 8(1996)-136704). In this method, however, since the etching is conducted through the resist opening, the bottom of a dug portion inevitably becomes flat and it is hence difficult to condense light into an area less than the area of the opening. Further, in a wet etching method, since an isotropic etching using a chemical action is principally employed, formation of the mother substrate into a desired profile cannot be achieved if the composition and crystalline structure of the mother substrate vary even slightly. In addition, etching will continue unless the plate is washed immediately after a desired shape is obtained. When a minute microlens is to be formed, a deviation of the shape from a desired one is possible due to etching lasting during a period from the time a desired profile is reached to the time the microlens is reached.

In yet another conventional microlens-array fabrication method using a resist reflow (or melting) method (see D. Daly, et al., Proc. Microlens Arrays Teddington., p 23-34, 1991), resin formed on a substrate is cylindrically patterned using a photolithography process and a microlens array is fabricated by heating and reflowing the resin. Lenses having various shapes can be fabricated at a low cost by this resist reflow method. Further, this method has no problems of thermal expansion coefficient, warping and so forth, in contrast with the ion exchange method.

In the resist reflow method, however, the profile of the microlens is strongly dependent on the thickness of the resin, the wetting condition between the substrate and the resin, and the heating temperature. Therefore, variations between lots are likely to occur while fabrication reproducibility per a single substrate surface is high. In addition, if adjacent resin comes in contact due to the reflow, the resist cannot maintain its desired profile due to surface tension. Therefore, it is hard to fabricate a microlens array in which adjacent microlenses are brought into contact and unusable regions between microlenses are reduced to increase the light-condensing efficiency.

SUMMARY OF THE INVENTION

It is an object of the present invention to provide a fabrication method of readily fabricating a microstructure array with reduced unusable regions between microstructures, such as microlenses, which can readily control the profile (such as the height and the radius of curvature) of the microstructure, and fabricate the microstructure array at a relatively low cost, a fabrication method of a mold for forming a microstructure array (such as a microlens array, a fly eye lens and a lenticular lens) with reduced unusable regions between microstructures, a fabrication method of fabricating a microstructure array using the mold, and a microstructure array with reduced unusable regions between microstructures. More particularly, it is an object to provide a mold for forming a microlens array with reduced unusable regions between microlenses. It is an additional object to provide a fabrication method of such a mold, and a fabrication method of the microlens array using the mold.

The present invention is generally directed to a fabrication method of a microstructure array, such as a mold for forming a microlens array, which includes a step of forming an array of microstructures with a curved profile in a discrete form on a substrate, and a step of forming a continuous layer on the substrate and the discrete microstructures.

In this method, unusable regions between the discrete microstructures, such as microlenses, can be readily eliminated since the continuous layer can be readily formed until flat portions between the microstructures disappear. When necessary, those flat portions can be left. Further, since the continuous layer is formed over the substrate and the discrete microstructures, the size distribution of the microstructures can be readily reduced, and the discrete microstructures can be firmly fixed to the substrate.

More specifically, the following constructions can be preferably adopted based on the above fundamental construction.

The continuous layer typically has an approximately uniform thickness. The continuous layer can be formed of an inorganic material such as nickel, or an organic material such as PSG (phospho-silicate glass).

The continuous layer can be formed by electroplating, electroless plating, or electrodeposition. In the cases of electroplating and electrodeposition, an electrode layer is formed on the substrate and the discrete microstructures, when necessary. The continuous layer can also be formed by chemical vapor deposition (CVD), or vacuum evaporation. In the cases of electroless plating, CVD and vacuum evaporation, the growth of the layer is isotropic, so that curvatures of the microstructures can be readily maintained as desired. In the cases of electroless plating, when the microstructures are formed of a material capable of electroless plating, the electroless plating can be performed as it is. When the microstructures are formed of a material unsuitable for electroless plating, a surface of the substrate is activated with an activating liquid, or a material suitable for electroless plating is deposited on the surface of the substrate by a sputtering method, a resistor heating method, an electron-beam evaporation method, CVD, or the like.

The microstructure with the curved profile can be formed such that an angle of contact (an angle, on the microstructure side, between the substrate surface and a tangential plane of the microstructure at a location at which the microstructure is in contact with the substrate) between the microstructure and the substrate reaches no less than 90 degrees. As a result, the height and curvature of the microstructure can be made relatively large.

The microstructure with the curved profile can have a spherical shape, a cylindrical shape, or the like according to its applications.

When the conditions $d/2 \leq l+h$, $h \leq t$, and $r=l+t \geq d/2$ are satisfied where $l$ is the radius of the microstructure with the curved profile, $\theta$ is the angle of contact between the substrate and the microstructure with the curved profile, $h$ (defined by $h = -l \cos \theta$) is the height between the substrate and a center of the microstructure with the curved profile, $t$ is the thickness of the continuous layer, and $d$ is the pitch of the array of the microstructures with the curved profile, unusable portions between the microstructures can be assuredly reduced or eliminated, as illustrated in FIG. 3. In addition, a microstructure array, such as a microlens array and a mold for a microlens array, with a large curvature can be obtained.

In such a structure as is illustrated in FIG. 3, the angle $\theta$ of contact between the spherical microstructure 23 and the substrate 22 is no less than 90 degrees, and the distance between adjacent spherical microstructures 23 is shortest at a level of the maximum diameter of the spherical microstructure 23. Further, since the condition of $l+h \geq d/2$ is satisfied, adjacent spherical microstructures 23 are joined at a position of the maximum diameter of the microstructure when the continuous layer 24 is formed to such a thickness that causes flat portions between spherical microstructures 23 to disappear (that is, the condition of $r=l+t \geq d/2$ is satisfied). Thus, a microstructure array with a large curvature can be obtained.

When $d/2 = l+t$ is satisfied for the thickness $t$ of the continuous layer 24, the relation of $r = d/2$ is attained, and a microstructure array, such as a microlens array and a mold for a microlens array, with an exactly-semispherical curvature can be obtained.

The above condition is a condition under which the continuous layer 24 joins together approximately at a location where the spherical microstructures 23 are closest to each other. The location where the continuous layer 24 joins gradually goes up as the thickness $t$ of the continuous layer 24 increases.

The microstructures with the curved profile can have a common shape, or plural shapes. Further, the microstructures with the curved profile can be regularly arranged (arranged with a common interval in horizontal and vertical directions, for example), or irregularly arranged. Those conditions can be determined according to its applications.

The microstructure with the curved profile can be formed of a resin (such as a photoresist), or a metal-plated layer.

The microstructures with the curved profile can be formed by forming a plurality of thermoplastic layers in a pattern of the array of microstructures on the substrate, and thermally processing and deforming the thermoplastic layers to form the array of microstructures with the curved profile. In this method, adjacent thermoplastic layers are never brought into contact at the time of reflow, and hence, the problem that the profile of the microstructure is undesirably deformed due to surface tension can be solved. Thus, the yield can be improved.

The discrete thermoplastic layer can have a cylindrical shape, a stripe shape, or a polygonal shape such as a tetragonal pole and a hexagonal pole. The discrete thermoplastic layers can have a common shape, or plural shapes. Further, the thermoplastic layers may be regularly arranged (arranged with a common interval in horizontal and vertical directions, for example), or irregularly arranged. Those conditions are also determined according to the application.

The thermoplastic layer can be a resin layer (such as a photoresist layer), or a metal-plated layer. The thermoplastic layer can be formed by a method suitable for its material. The shape of a thermally-processed and deformed thermoplastic layer can be appropriately controlled by processing a surface of the substrate into a water-repellant surface before thermal processing, for example.

At least a structure for an alignment marker can also be formed in an area outside an area of the array of microstructures. As a result, the structure for an alignment marker can be provided at an appropriate position. Thus, a microstructure array, such as a microlens array, provided with an alignment marker can be fabricated with a good yield.

The microstructure array can be fabricated as a mold for a microstructure array such as a mold for a microlens array. When the substrate, the microstructures with the curved profile, and the continuous layer are formed of transparent material, respectively, the microstructure array can be directly used as a microlens array.

Further, the present invention is generally directed to a microstructure array which includes an array of microstructures with a curved profile formed in a discrete form on a substrate, and a continuous layer formed on the substrate and the discrete microstructures.

These advantages, as well as others will be more readily understood in connection with the following detailed description of the preferred embodiments of the invention in connection with the drawings.

DESCRIPTION OF THE PREFERRED EMBODIMENTS

Figure 1A:
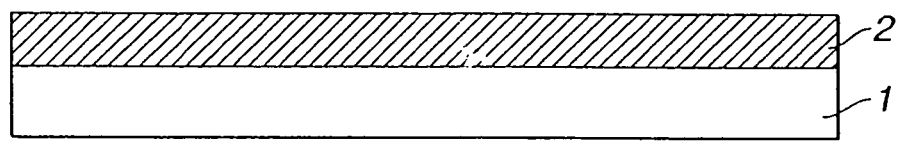
FIGS. 1A to 1D are cross-sectional views illustrating fabrication steps in a fabrication method of a mold for forming a microlens array of a first embodiment to a fifth embodiment according to the present invention.

A first embodiment of the present invention will be described with reference to FIGS. 1A to 2C, and 5. In the first embodiment, a silicon wafer 1 with a diameter of four inches is surface-processed by using a silane coupling agent having functional groups having fluorine, and a water-repellant surface is formed on the wafer 1. A positive photoresist is then spin-coated to a thickness of 8 µm to form a thermoplastic resin layer 2 on the wafer 1, as illustrated in FIG. 1A.

Figure 1B:
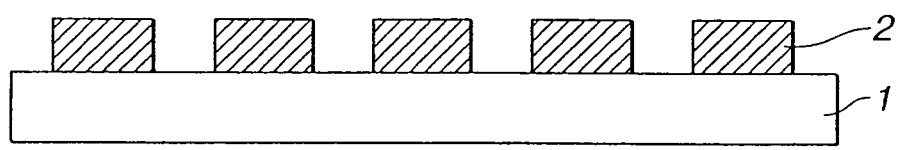

Thereafter, 1064×808 cylindrical resist microstructures 2 are formed at common intervals of 18 µm using semiconductor photolithography, as illustrated in FIG. 1B. Each resist microstructure 2 is a thermoplastic resin layer as described above.

Figure 1C:
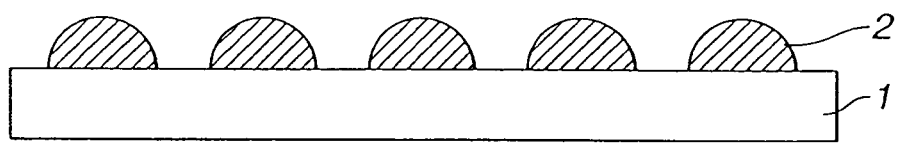

The substrate or wafer 1 is then baked at a temperature of 150° C. for fifteen (15) minutes. The thermoplastic resin layers 2 hence undergo reflow, and spherical resin layers 2 are formed as illustrated in FIG. 1C. Here, the angle of contact between the spherical resin layer 2 and the substrate 1 is eighty (80) degrees.

After being cooled, the substrate 1 is immersed in a conditioner solution. The substrate 1 is then immersed in a catalyst solution containing colloids of palladium (Pd)-tin (Sn) to form catalyst cores on the substrate 1 and the spherical resin layers 2.

Figure 1D:
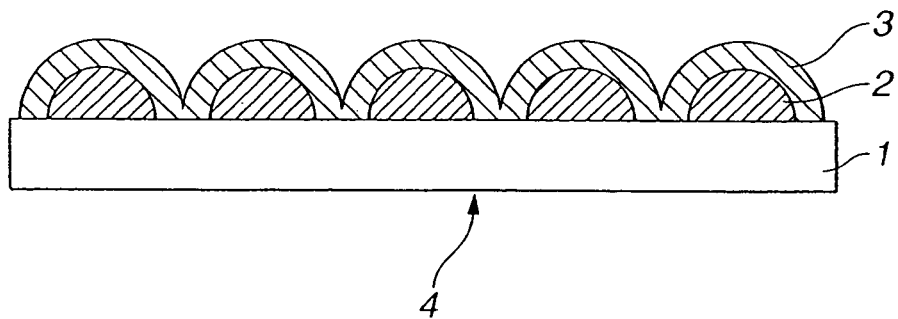

Ni electroless plating is then performed at a bath temperature of 90° C. to form a continuous plated layer 3 on the substrate 1 and the resin layers 2, as illustrated in FIG. 1D. Ni electroless plating solution (product name S-780 produced by Nihon Kanizen Com.) is used. The electroless plating is continued until flat portions between the spherical microstructures 2 disappear. Here, since the electroless plated layer 3 is isotropically deposited, the radius of curvature of the plated layer 3 remains the same as that of the resin layer 2 subjected to the reflow. The radius of curvature is 15 µm. Thus, a mold master 4 for forming a mold for an array of 1064×808 microlenses is obtained, as illustrated in FIG. 1D.

Any material, such as glass, quartz, ceramics, resin, metal, semiconductor (a silicon wafer, or the like), and crystal substance, can be used as the substrate material. As the thermoplastic layer, photoresist, glass, metal, and the like can be used so long as its softening temperature is lower than that of the substrate used.

The thermoplastic layer can be patterned in a desired form typically by semiconductor photolithography and etching. When the photoresist is used, the etching step of the thermoplastic layer can be omitted. When the thermoplastic layer is patterned into a stripe shape, a mold for a lenticular lens can be fabricated, for example.

Further, the patterning of the thermoplastic layer can also be performed by patterning a photoresist or the like of a mask layer on a conductive portion of the substrate, forming plated layers on exposed conductive portions, and removing the mask layer. In addition, the patterning of the thermoplastic layer can also be performed by dropping small drops of thermoplastic material on the substrate according to a desired pattern.

The continuous layer can be a plated layer, a CVD layer, a vacuum evaporation layer, or an electrodeposited layer. As an electrodeposition liquid, an electrodepositable organic compound (acryl-series resin and the like in the case of the anionic-type electrodeposition, and epoxy-series resin and the like in the case of the cationic-type electrodeposition) can be used.

When the continuous plated layer is formed by electroplating, an electrode layer needs to be formed on the resin layer and the substrate. However, when electroless plating is employed, there is no such need. The curved profile of the plated layer can be readily controlled by controlling the plating time and temperature. The following materials can be used as electroplating metal, for example. As a single metal, Ni, Au, Pt, Cr, Cu, Ag, Zn and the like can be employed. As an alloy, Cu—Zn, Sn—Co, Ni—Fe, Zn—Ni and the like can be used. Any material can be used so long as electroplating is possible.

A mold for a microlens array can be fabricated directly from an original substrate discussed above. Therefore, no expensive equipment is needed, and the mold can be fabricated at a low cost. The mold can be mechanically separated from the original substrate. In the case of a large-sized mold, there is a fear that the mold will be deformed when separated from the original substrate. Accordingly, the mold can be preferably separated by removing the substrate, the thermoplastic layer, and the continuous layer sequentially from the bottom surface.

When a mold is formed after a sacrificial layer is formed on the continuous layer, the mold can be separated from the substrate by removing the sacrificial layer. In this case, a material of the sacrificial layer is selected such that the mold cannot be corroded by an etchant for etching the sacrificial layer. Where none of the continuous layer and the substrate is corroded by the etchant for etching the sacrificial layer, the substrate with the continuous layer can be used as an original substrate a plurality of times. When the original substrate becomes unusable due to damage, contamination and the like after plural uses, another mold master can be fabricated-by the same method as above.

As a material of the mold, any material, such as resin, metal, and insulating substance, can be used so long as it can be formed on the substrate with the continuous layer and separated therefrom. In a simple method of fabricating a mold, a material, such as resin, metal, or fused or dissolved glass, is coated on the substrate with the continuous layer, and the material is separated from the mold after being hardened. When metal is used, metal that will not produce an alloy with the substrate and the continuous layer is preferably selected.

The mold can also be fabricated as follows, for example. An electrode layer is formed on the continuous layer, and a mold is formed by electroplating while the substrate is used as a cathode. Where a sacrificial layer is used, an electrode layer for the mold is formed on the sacrificial layer, and electroplating is performed while this electrode layer is used as a cathode.

Figure 2A:
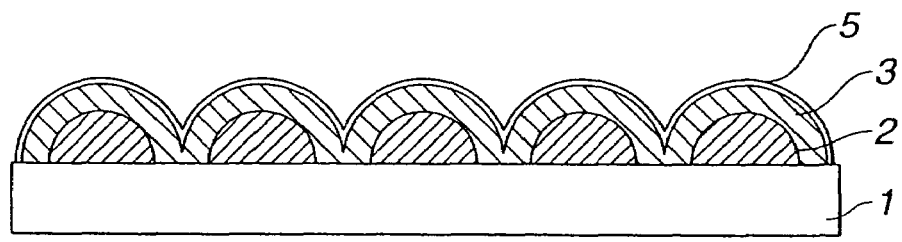
FIGS. 2A to 2C are cross-sectional views illustrating fabrication steps of the first embodiment to the fifth embodiment.
Figure 2B:
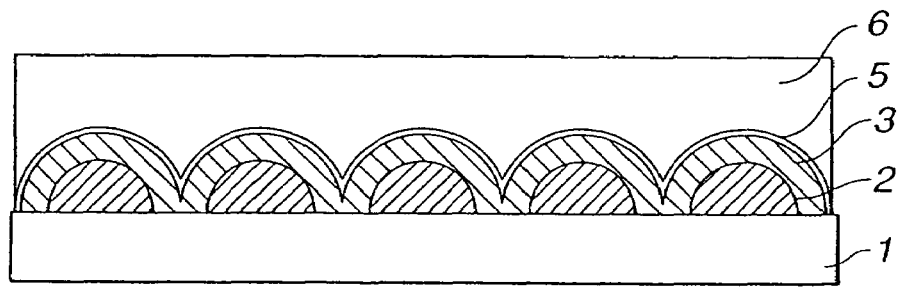
Figure 2C:
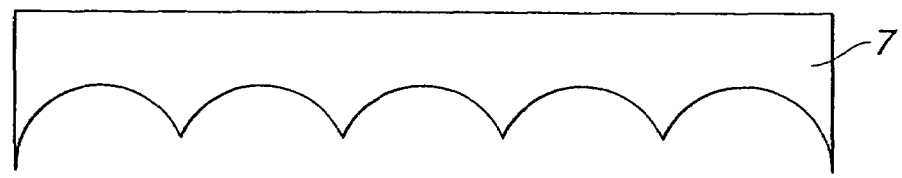

In the first embodiment, a mold is fabricated in the following manner. A remover agent for electroplating is coated on the electroless plated layer 3 of the mold master 4 to form a remover layer 5, as illustrated in FIG. 2A. Ni electroplating is then performed while this substrate is used as a cathode. An Ni electroplating bath containing nickel (II) sulfamate, nickel (II) bromide, boric acid and brightener is used. The Ni electroplating is conducted at a bath temperature of 50° C. and at a cathode current density of 5 A/dm². Thus, an electroplated layer 6 is formed as illustrated in FIG. 2B. After that, the electroplated layer 6 is separated from the substrate by removing the remover layer 5 to obtain a mold 7 for an array of 1064×808 microlenses, as illustrated in FIG. 2C.

Figure 5:
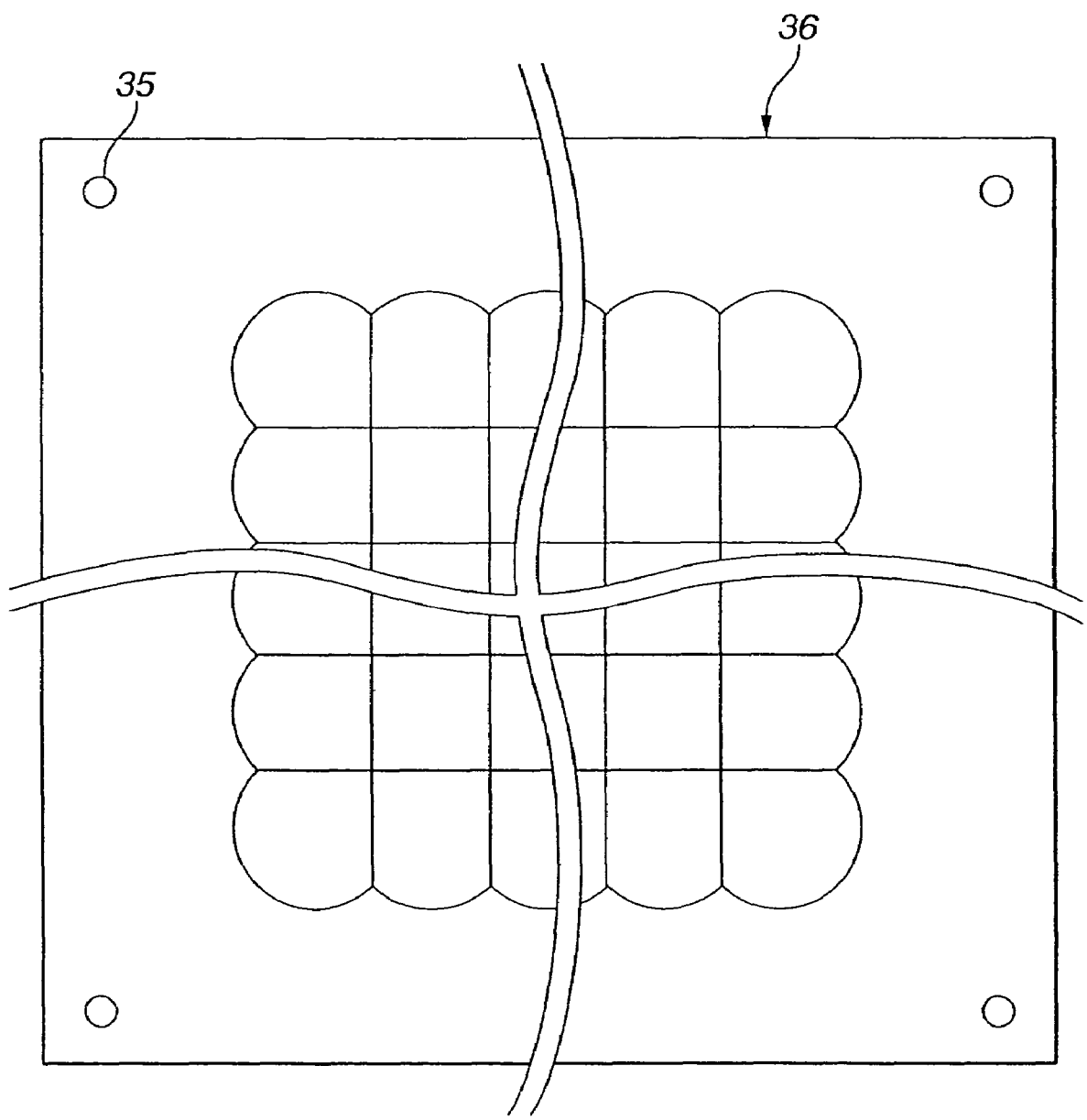
FIG. 5 is a plan view illustrating a microlens array fabricated by the present invention.

A convex microlens array can be fabricated by using the above mold 7. For example, after an ultraviolet-ray hardening resin is laid down over the mold 7, a glass substrate of a support is placed on the resin. After the resin is exposed to ultraviolet radiation through the glass substrate to be hardened, the glass substrate with the resin is separated from the mold 7. An array of 1064×808 convex microlenses 36 is thus fabricated, as illustrated in FIG. 5, with the exception of an alignment marker 35. There are no flat portions between the convex spherical lenses of this microlens array, so that no optically-unusable region remains therein. The curvature of the convex spherical lens is equal to that of the resin layer 2 subjected to the reflow, and the radius of curvature of the lens is also 15 µm.

As a resin for the microlens array, a transparent thermosetting resin, and an electron-beam hardening resin can also be used. When the microlens array is formed as discussed above, there is no need to use alkaline glass. Therefore, as compared with the ion exchange method, limitations to material of the microlens and the support substrate can be greatly reduced. When fused glass is used in place of resin, a microlens array formed of glass can be obtained.

A second embodiment of the present invention will be described with reference to FIGS. 1A to 2C and 5, similar to the first embodiment.

In the second embodiment, the processes are the same as those of the first embodiment until spherical layers 2 are formed after the reflow of the resin layers 2 (see FIG. 1C). In the second embodiment, however, the angle of contact between the spherical layer 2 and the substrate 1 is eighty five (85) degrees. This angle is larger than that in the first embodiment, and indicates that the spherical layer 2 of the second embodiment is nearer to a true semisphere at which the angle of contact reaches ninety (90) degrees. The height of the resin layer 2 in the second embodiment is larger than that in the first embodiment. As discussed above, the angle of contact can be controlled by controlling the surface energy of the substrate 1, the thickness and thermal deformability of the resin layer 2, the baking temperature and time, and so forth.

Further, similar to the first embodiment, the substrate 1 is immersed in a conditioner solution after being cooled, and Ni electroless plating is performed to form the plated layer 3 on the substrate 1 and the resin layers 2. Also in the second embodiment, the electroless plating operation is continued until flat portions between the spherical microstructures 2 disappear. Here also, since the electroless plated layer 3 is isotropically deposited, the curvature of the plated layer 3 is the same as that of the reflow resin layer 2. The radius of curvature is 14 µm. This value is a little smaller than that of the first embodiment. Thus, a mold master 4 for forming an array of 1064×808 microlenses is obtained, as illustrated in FIG. 1D.

A mold 7 for an array of 1064×808 microlenses can be obtained in a manner similar to the first embodiment, as illustrated in FIG. 2C. An array of 1064×808 convex microlenses 36 as illustrated in FIG. 5 can be fabricated using the mold 7, in a similar manner to the first embodiment. There are no flat portions between convex spherical lenses of the microlens array obtained in the second embodiment, so that no optically-unusable region remains therein. Also in the second embodiment, the curvature of the spherical lens is equal to that of the reflow resin layer 2, and the radius of curvature of the lens is 14 µm.

A third embodiment of the present invention will be described with reference to FIGS. 1A to 2C and 5, which is similar to the first embodiment.

In the third embodiment, on a silicon wafer 1 with a diameter of four inches, a positive photoresist is spin-coated to a thickness of 8 µm to form a thermoplastic resin layer 2, as illustrated in FIG. 1A.

Thereafter, 1064×808 square resist microstructures 2 with sides of 16 µm are formed at common intervals of 2 µm using semiconductor photolithography, as illustrated in FIG. 1B. At the same time, a pattern for an alignment marker is formed at a desired position outside a region of the array of the resist microstructures 2.

The substrate 1 is then baked at a temperature of 150° C. for fifteen (15) minutes. The thermoplastic resin layers 2 including the pattern for the alignment marker hence undergo reflow, and spherical resin layers 2 are formed as illustrated in FIG. 1C.

Cr and Au are then continuously layered to thicknesses of 50 Å and 1000 Å on the above wafer, respectively, using an electron-beam evaporation method. An electrode layer is thus formed. Ni electroplating is then performed while this electrode layer is used as a cathode. An Ni electroplating bath containing nickel (II) sulfate, nickel (II) chloride, boric acid and brightener is used. The electroplating is conducted at a bath temperature of 60° C. and a cathode current density of 5 A/dm$^2$. An electroplated layer 3 is thus formed on that electrode layer until flat portions between the spherical microstructures 2 disappear. Thus, a mold master 4 for forming an array of 1064×808 microlenses with an alignment marker structure is obtained, as illustrated in FIG. 1D.

A remover agent for electroplating is then coated on the plated layer 3 of the mold master 4 to form a remover layer 5, as illustrated in FIG. 2A. Ni electroplating is then performed while this substrate is used as a cathode. An Ni electroplating bath containing nickel (II) sulfamate, nickel (II) bromide, boric acid and brightener is used. The Ni electroplating is conducted at a bath temperature of 50° C. and a cathode current density of 5 A/dm$^2$. Thus, an electroplated layer 6 is formed as illustrated in FIG. 2B. After that, the plated layer 6 is separated from the substrate by removing the remover layer 5 to obtain a mold 7 for an array of 1064×808 microlenses with an alignment marker, as illustrated in FIG. 2C.

Also in this embodiment, a convex microlens array can be fabricated by using the above mold 7, as follows. For example, after an ultraviolet-ray hardening resin is laid down over the mold 7, a glass substrate of a support is placed on the resin. After the resin is exposed to ultraviolet radiation through the glass substrate to be hardened, the glass substrate with the resin is separated from the mold 7. An array of 1064×808 convex microlenses 36 with alignment markers 35 as illustrated in FIG. 5 is thus fabricated. Also in this microlens array 36, there are no flat portions between convex spherical lenses, so that no optically-unusable region remains therein.

The microlens array 36 can be used as follows. For example, when a marker formed on a driver substrate of a display device, such as a TFT liquid crystal substrate, is aligned with the alignment marker 35 of the convex microlens array 36 and the driver substrate and the microlens array 36 are bonded, each microlens can be set at a position corresponding to each pixel of the display device. When those bonded structures are connected to a driver circuit and driven as a liquid crystal projector, incident light is condensed by each microlens and a bright display image can be obtained.

A fourth embodiment of the present invention will be described with reference to FIGS. 1A to 2C and 6, which is similar to the above embodiments. In the fourth embodiment, a silicon wafer 1 with a diameter of five inches is surface-processed using a silane coupling agent having functional groups containing fluorine, and a water-repellant surface is formed on the wafer 1. The surface energy of the substrate 1 is decreased by this surface processing, and a thermoplastic material is strongly repelled. A positive photoresist is then spin-coated to a thickness of 8 μm to form a thermoplastic resin layer 2, as illustrated in FIG. 1A.

Figure 6:
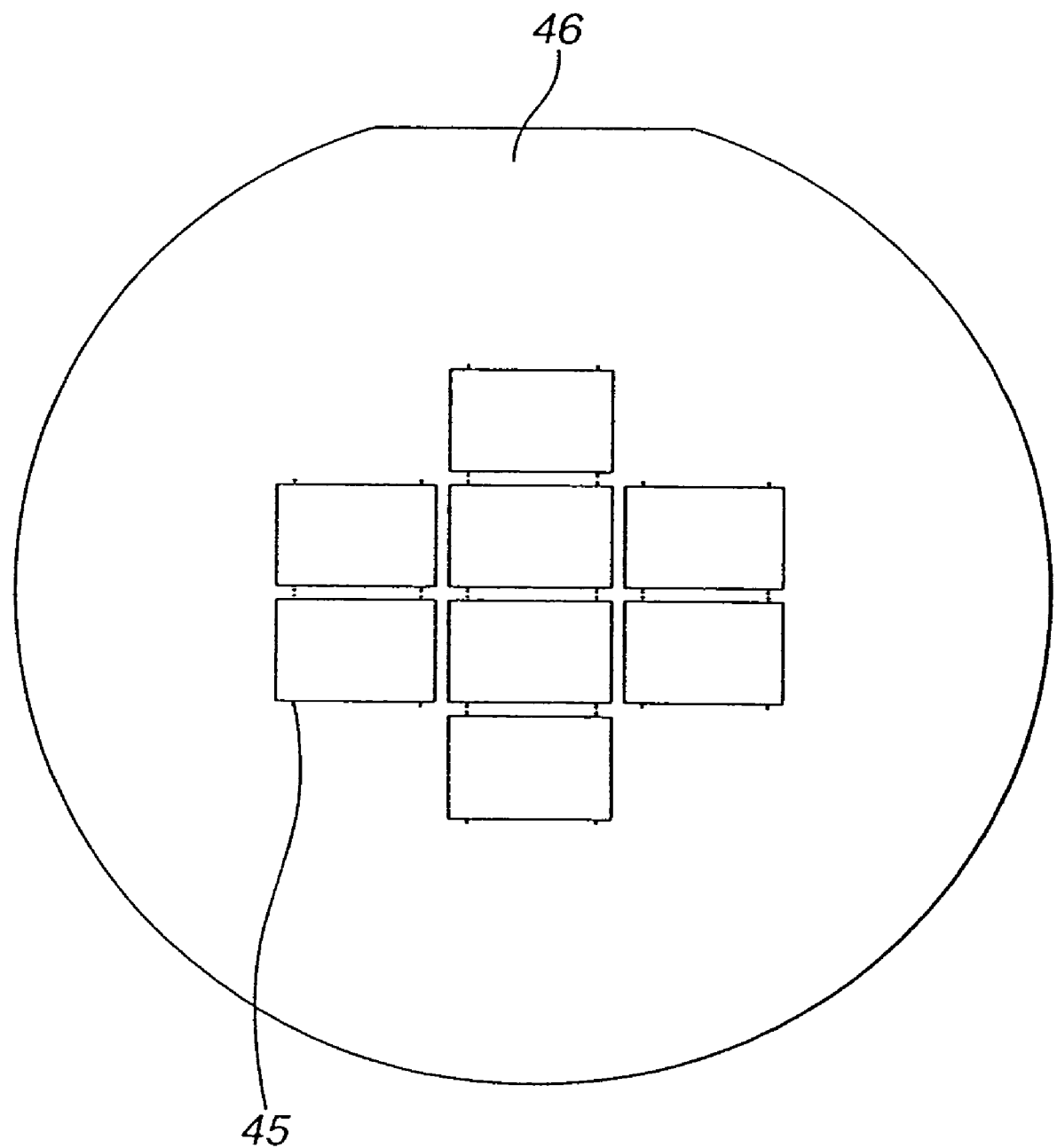
FIG. 6 is a plan view illustrating a mold for forming a microlens array fabricated by the present invention.

Thereafter, eight sets of 1064×808 square resist microstructures with sides of 16 μm are formed at common intervals of 2 μm using semiconductor photolithography, as illustrated in FIG. 6, which illustrates a wafer 46 and structures 45 for alignment markers. The interval between those eight sets is 1.8 mm. Four structures for the alignment marker for achieving a positional alignment are also formed outside a region of each set of the 1064×808 square resist microstructures.

The substrate 1 or 46 is then baked at a temperature of 150° C. for fifteen (15) minutes. The thermoplastic resin layers 2 hence undergo reflow, and spherical resin layers 2 are formed as illustrated in FIG. 1C.

After being cooled, the substrate 1 or 46 is immersed in a conditioner solution. After that, the substrate 1 is immersed in a catalyst solution containing colloids of palladium (Pd)-tin (Sn) to form catalyst cores on the substrate 1 or 46 and the resin layers 2.

Ni electroless plating is then performed at a bath temperature of 90° C. to form a plated layer 3 on the substrate 1 and the resin layers 2, as illustrated in FIG. 1D. Ni electroless plating solution (product name S-780) is used. The electroless plating is continued until flat portions between the spherical microstructures 2 disappear. Also herein, since the electroless plated layer 3 is isotropically deposited, the curvature of the plated layer 3 is the same as that of the reflow resin layer 2. The radius of curvature is 15 μm. Thus, a mold master 4 for forming a mold for a microlens array including eight sets of 1064×808 microlenses with alignment markers on the same face is obtained, as illustrated in FIG. 6. In the structure of FIG. 6, four structures 45 for the alignment marker are formed on four corners of each set of 1064×808 microstructures.

A remover agent for electroplating is then coated on the electroless plated layer 3 of the mold master 4 to form a remover layer 5, as illustrated in FIG. 2A. Ni electroplating is then performed while this substrate is used as a cathode. An Ni electroplating bath containing nickel (II) sulfamate, nickel (II) bromide, boric acid and brightener is used. The Ni electroplating is conducted at a bath temperature of 50° C. and a cathode current density of 5 A/dm$^2$. Thus, a plated layer 6 is formed as illustrated in FIG. 2B. After that, the plated layer 6 is separated from the substrate by removing the remover layer 5 to obtain a mold 7 for forming a microlens array, as illustrated in FIG. 2C. Thus, a mold for forming a microlens array including eight sets of 1064×808 microlenses with alignment markers on the same face is obtained.

A convex microlens array can be fabricated by using the above mold 7. For example, after an ultraviolet-ray hardening resin is laid down over the mold 7, a glass substrate of a support is placed on the resin. After the resin is exposed to ultraviolet radiation through the glass substrate to be hardened, the glass substrate with the resin is separated from the mold 7. Eight sets of arrays of 1064×808 convex microlenses with alignment markers can be thus fabricated by using a single mold and cutting the glass substrate with the resin into eight blocks.

A fifth embodiment of the present invention will be described with reference to FIGS. 1A to 2C, which is similar to the above embodiments. In the fifth embodiment, a silicon wafer 1 with a diameter of four inches is surface-processed using a silane coupling agent having functional groups containing fluorine, and a water-repellant surface is formed on the wafer 1. A positive photoresist is then spin-coated to a thickness of 8 μm to form a thermoplastic resin layer 2, as illustrated in FIG. 1A.

Thereafter, a set of 1064×808 square resist microstructures 2 with sides of 16 μm and at common intervals of 2 μm, a set of 1064×808 square resist microstructures 2 with sides of 14 μand at common intervals of 4 μm, and a set of 1064×808 square resist microstructures 2 with sides of 12 μm and at common intervals of 6 μm are formed on the same wafer 1. The interval between those three sets is 1.8 mm.

The substrate 1 is then baked at a temperature of 150° C. for fifteen (15) minutes. The thermoplastic resin layers 2 hence undergo reflow, and spherical resin layers 2 are formed as illustrated in FIG. 1C.

After being cooled, the substrate 1 is immersed in a conditioner solution. After that, the substrate 1 is immersed in a catalyst solution containing colloids of palladium (Pd)-tin (Sn) to form catalyst cores on the substrate 1 and the resin layers 2.

Ni electroless plating is then performed at a bath temperature of 90° C. to form a plated layer 3 on the substrate 1 and the resin layers 2, as illustrated in FIG. 1D. An Ni electroless plating solution (product name S-780) is used. The electroless plating is continued until flat portions between the spherical microstructures 2 disappear. Also herein, since the electroless plated layer 3 is isotropically deposited, the curvature of the plated layer 3 is the same as that of the reflow resin layer 2. Thus, a mold master 4 for forming a mold for three kinds of microlens arrays including three different sets of 1064×808 microstructures with different curvatures on the same face is obtained.

A remover agent for electroplating is then coated on the electroless plated layer 3 of the mold master 4 to form a remover layer 5, as illustrated in FIG. 2A. Ni electroplating is then performed while this substrate is used as a cathode. An Ni electroplating bath containing nickel (II) sulfamate, nickel (II) bromide, boric acid and brightener is used. The Ni electroplating is conducted at a bath temperature of 50° C. and a cathode current density of 5 A/dm². Thus, a plated layer 6 is formed as illustrated in FIG. 2B. After that, the plated layer 6 is separated from the substrate by removing the remover layer 5 to obtain a mold 7 for forming three kinds of microlens arrays, as illustrated in FIG. 2C. Thus, a mold for forming three kinds of microlens arrays including three different sets of 1064×808 microlenses with different curvatures on the same face is obtained.

Three kinds of convex microlens arrays can be fabricated by using the above mold 7. For example, after an ultraviolet-ray hardening resin is laid down over the mold 7, a glass substrate of a support is placed on the resin. After the resin is exposed to ultraviolet radiation through the glass substrate to be hardened, the glass substrate with the resin is separated from the mold 7. Three arrays of 1064×808 convex microlenses with different curvatures are thus fabricated by using a single mold and cutting the glass substrate with the resin into three blocks.

A sixth embodiment of the present invention will be described with reference to FIGS. 3, 4A, 4B and 5. In the sixth embodiment, on a silicon wafer 22 with a diameter of two inches, 1024×768 spherical microstructures 23 are formed at common intervals of 18 μm. An Ni electroless nickel plated layer 24 is formed on the silicon substrate 22 and the microstructures 23. The electroless plated layer 24 is a continuous layer which is isotropically grown.

Figure 3:
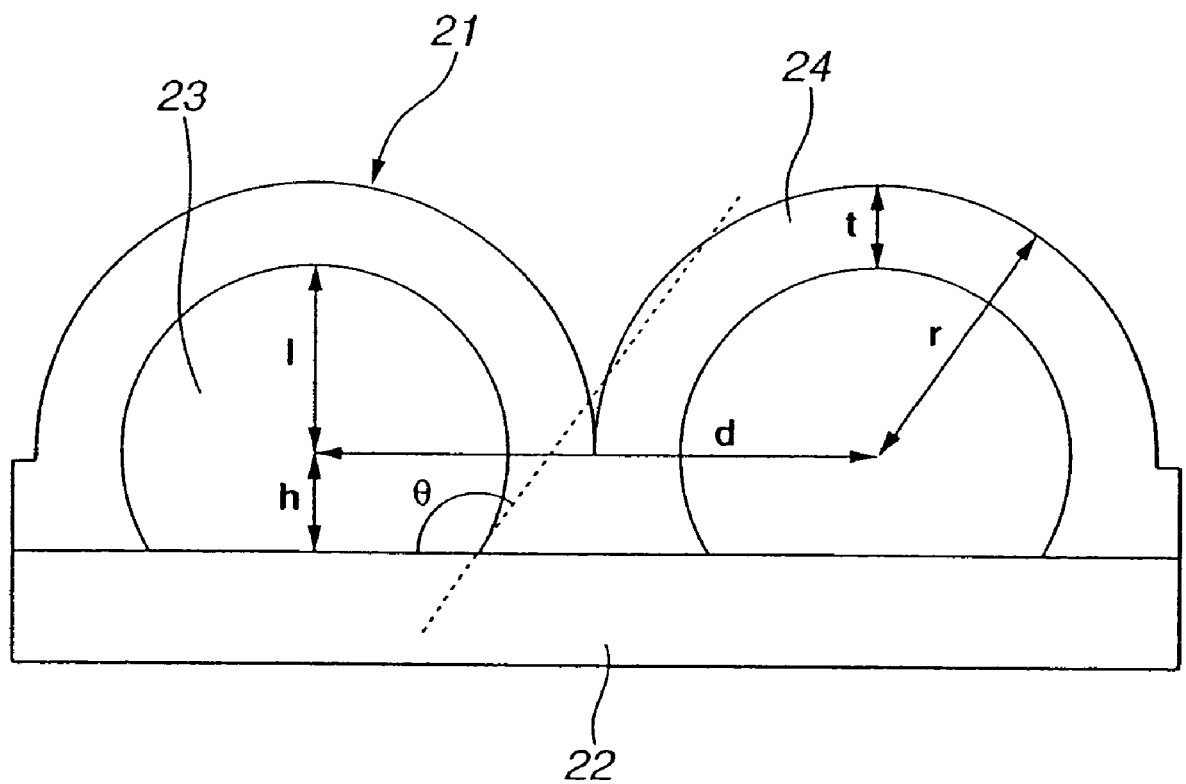
FIG. 3 is a cross-sectional view illustrating a microlens array or a mold for forming a microlens array of a sixth embodiment to a tenth embodiment according to the present invention.
Figure 4A:
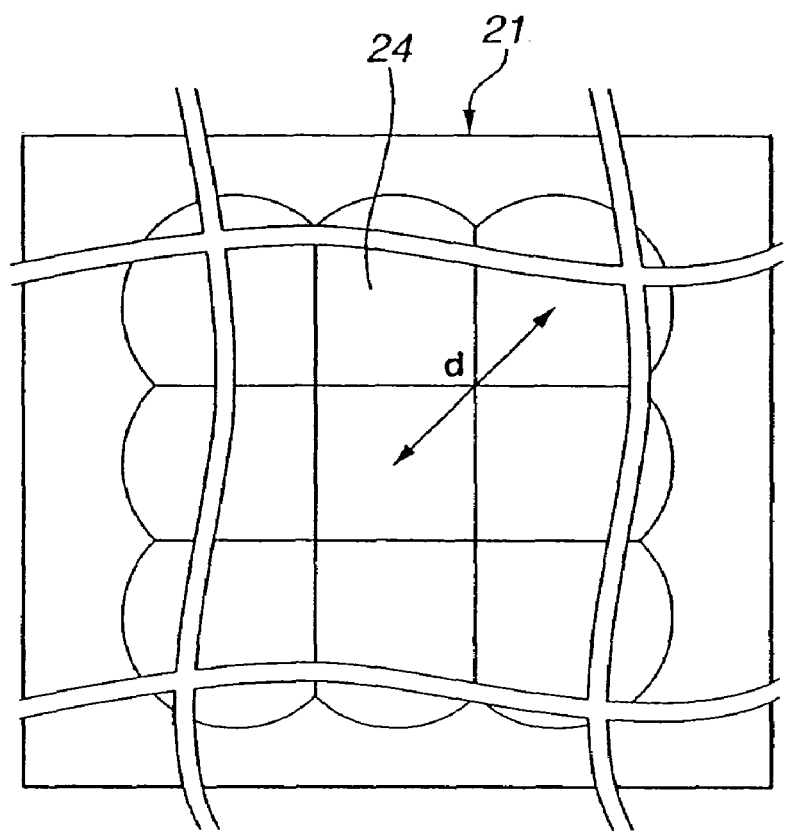
FIG. 4A is a plan view illustrating the sixth embodiment to the eighth embodiment.
Figure 4B:
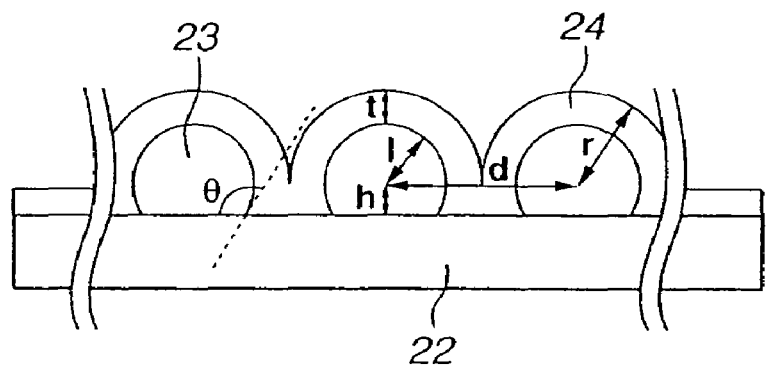
FIG. 4B is a cross-sectional view illustrating the sixth embodiment and the seventh embodiment.

In this embodiment, the radius l of the spherical microstructure 23 is 8.5 μm, the height h between the center of the spherical microstructure 23 and the substrate 22 is 4.2 82 m, and the angle θ of contact between the spherical microstructure 23 and the substrate 22 is 120 degrees (see FIGS. 3 and 4B). Further, the pitch d of the spherical microstructure 23 in its diagonal direction is 25.4 μm, and the thickness t of the continuous layer 24 is 4.2 μm (see FIGS. 3, 4A and 4B).

Accordingly, the relationship between the radius of curvature r(=l+t) of this mold for a microlens array and the pitch d of the spherical microstructure 23 in its diagonal direction is given by:

$$r=d/2=12.7\ \mu m(=l+h).$$

And the surface of the continuous layer 24 has an exactly-semispherical profile.

A method of fabricating a mold for a microlens array by using the above substrate as a mold master will be described.

A remover agent for electroplating is coated on the above substrate. Ni electroplating is then performed while this substrate is used as a cathode. An Ni electroplating bath containing nickel (II) sulfamate, nickel (II) bromide, boric acid and brightener is used. The Ni electroplating is conducted at a bath temperature of 50° C. and a cathode current density of 5 A/dm². Thus, a plated layer is formed. After that, the plated layer is separated from the substrate by removing the remover layer to obtain a mold for a microlens array.

A convex microlens array can be fabricated by using the above mold, which is similar to the above embodiments. The thus-fabricated microlens array satisfies the relationship r=d/2=12.7 μm. Each microlens has an exactly-semispherical profile.

A seventh embodiment of the present invention will be described with reference to FIGS. 3, 4A and 4B. In the seventh embodiment, on a silicon wafer 22 with a diameter of two inches, 1024×768 spherical microstructures 23 are formed at common intervals of 18 μm. An Ni electroless nickel plated layer 24 is formed on the silicon substrate 22 and the microstructures 23. The electroless plated layer 24 is a continuous layer 24 that is isotropically grown.

In this embodiment, the radius l of the spherical microstructure 23 is 6.8 μm, the height h between the center of the spherical microstructure 23 and the substrate 22 is 5.9 μm, and the angle θ of contact between the spherical microstructure 23 and the substrate 22 is 150 degrees. Further, the pitch d of the spherical microstructures 23 in its diagonal direction is 25.4 μm, and the thickness t of the continuous layer 24 is 5.9 μm.

Therefore, the relationship between the radius r (=l+t) of curvature of this mold for a microlens array and the pitch d of the spherical microstructures 23 in its diagonal direction is also given by:

$$r=d/2=12.7\ \mu m(=l+h).$$

And the surface of the continuous layer 24 has an exactly-semispherical profile.

In this embodiment, a mold for a microlens array and a convex microlens array can be fabricated, in a manner similar to the sixth embodiment. The thus-fabricated microlens array also satisfies the relationship r=d/2=12.7 μm, and each microlens has an exactly-semispherical profile.

An eighth embodiment of the present invention will be described with reference to FIGS. 3, 4A, and 4C. In the eighth embodiment, on a silicon wafer 22 with a diameter of two inches, 1024×768 spherical microstructures 23 are formed at common intervals of 18 μm. An Ni electroless nickel plated layer 24 is formed on the silicon substrate 22 and the microstructures 23. The electroless plated layer 24 is a continuous layer that is isotropically grown.

In this embodiment, the radius l of the spherical microstructure 23 is 8.5 μm, the height h between the center of the spherical microstructure 23 and the substrate 22 is 4.2 μm, and the angle θ of contact between the spherical microstructure 23 and the substrate 22 is 120 degrees. Further, the pitch d of the spherical microstructures 23 in its diagonal direction is 25.4 µm, and the thickness t of the continuous layer 24 is 5 µm.

Therefore, the relationship between the radius r (=l+t) of curvature of this mold for a microlens array and the pitch d of the spherical microstructure 23 in its diagonal direction is given by:

$$r=13.5 \text{ µm}(>d/2=l+h=12.7 \text{ µm}).$$

Figure 4C:
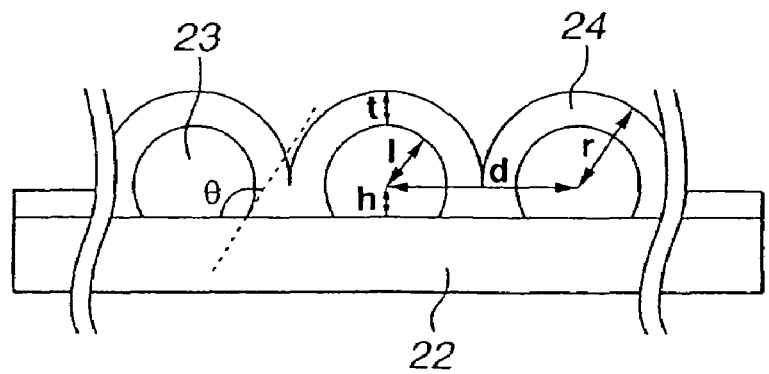
FIG. 4C is a cross-sectional view illustrating the eighth embodiment.

In this embodiment, the continuous layer 24 joins together at a level slightly higher than the height h as illustrated in FIG. 4C, differently from the sixth and seventh embodiments. And the radius r of curvature increases a little compared to the sixth and seventh embodiments.

Also in this embodiment, a mold for a microlens array and an array of 1024×768 convex microlenses can be fabricated, in a manner similar to the sixth embodiment. The thus-fabricated microlens array also has no optically-unusable regions between the microlenses, and each microlens has the radius r of curvature of 13.5 µm.

A ninth embodiment of the present invention will be described with reference to FIGS. 3 and 5. In the ninth embodiment, on a silicon wafer 22 with a diameter of two inches, 1024×768 spherical microstructures 23 are formed at common intervals of 18 µm. An Ni electroless nickel plated layer 24 is formed on the silicon substrate 22 and the microstructures 23. The electroless plated layer 24 is a continuous layer that is isotropically grown.

In this embodiment, the radius l of the spherical microstructure 23 is 8.5 µm, the height h between the center of the spherical microstructure 23 and the substrate 22 is 4.2 82 m, and the angle θ of contact between the spherical microstructure 23 and the substrate 22 is 120 degrees. Further, the pitch d of the spherical microstructures 23 in its diagonal direction is 25.4 µm, and the thickness t of the continuous layer 24 is 5 µm.

Therefore, the relationship between the radius r (=l+t) of curvature of this mold for a microlens array and the pitch d of the spherical microstructure 23 in its diagonal direction is given by:

$$r=d/2=12.7 \text{ µm}(=l+h).$$

And the surface of the continuous layer 24 has an exactly-semispherical profile. A structure for an alignment marker is also formed at another position on the substrate 22.

Also in this embodiment, a mold for a microlens array and an array of 1024×768 convex microlenses can be fabricated, in a manner similar to the sixth embodiment. The thus-fabricated microlens array also satisfies the relationship r=d/2=12.7 µm. Each microlens has an exactly-semispherical profile. Further, alignment markers 35 are provided on a microlens array 36, as illustrated in FIG. 5. In FIG. 5, four alignment markers 35 are formed on four corners of the microlens array 36.

For example, when a marker formed on a driver substrate of a display device, such as a TFT liquid crystal substrate, or an image pickup device, is aligned with the alignment marker 35 of the convex microlens array 36 and the driver substrate and the microlens array are bonded, each microlens can be set at a position corresponding to each pixel or light-receiving portion. When those bonded structures are connected to a driver circuit and driven as a liquid crystal projector, for example, incident light is condensed by each microlens and a bright display image can be obtained.

A tenth embodiment of the present invention will be described with reference to FIGS. 3 and 6. In the tenth embodiment, on a silicon wafer 22 with a diameter of five inches, eight sets of arrays of 1024×768 spherical microstructures 23 are formed at common intervals of 18 µm. The interval between those eight sets is 1.8 mm. An Ni electroless nickel plated layer 24 is formed on the silicon substrate 22 and the microstructures 23. The electroless plated layer 24 is a continuous layer that is isotropically grown. A structure for an alignment marker for achieving a positional alignment is also formed for each set of the 1024×758 microstructures 23 outside a region of the set. As illustrated in FIG. 6, structures 45 for the alignment marker are formed on four corners of each set of 1024×758 microstructures.

In this embodiment, the radius l of the spherical microstructure 23 is 9.5 µm, the height h between the center of the spherical microstructure 23 and the substrate 22 is 3.2 µm, and the angle θ of contact between the spherical microstructure 23 and the substrate 22 is 110 degrees. Further, the pitch d of the spherical microstructures 23 in its diagonal direction is 25.4 µm, and the thickness t of the continuous layer 24 is 3.2 µm.

Therefore, the relationship between the radius of curvature r (=l+t) of this mold for a microlens array and the pitch d of the spherical microstructure 23 in its diagonal direction is also given by:

$$r=d/2=12.7 \text{ µm}(=l+h).$$

And the surface of the continuous layer 24 has an exactly-semispherical profile.

In this embodiment, a mold for eight sets of arrays of 1024×758 microstructures with the structure for the alignment marker can be obtained.

Eight sets of convex microlens arrays can be fabricated by using the above mold. The thus-fabricated microlens array also satisfies the relationship r=d/2=12.7 µm. Each microlens has an exactly-semispherical profile. Further, four alignment markers are also provided on each microlens array.

An eleventh embodiment of the present invention will be described. In the eleventh embodiment, a quartz substrate of 24 mm×38 mm is spin-coated with a layer of polyamic acid to a thickness of 12 µm. A polyimide layer is formed by baking the wafer. A layer of aluminum (Al) is then formed by an electron-beam vacuum evaporation. A photoresist is then coated. Thereafter, 1064×808 cylindrical Al microstructures are formed at common intervals of 18 µm using semiconductor photolithography.

The polyimide layer is etched by reactive ion etching using the pattern of Al microstructures as a mask. Thus, 1064×808 cylindrical polyimide microstructures are formed at common intervals of 18 µm.

The substrate is then baked at a temperature of 450° C. for fifteen (15) minutes. The polyimide layers hence undergo reflow, and spherical layers are formed. Here, the angle of contact between the spherical resin layer and the substrate is 120 degrees. The radius l of the spherical microstructure is 8.5 µm, the height h between the center of the spherical microstructure and the substrate is 4.2 µm, and the pitch d of the spherical microstructures in its diagonal direction is 25.4 µm. The angle of contact is controlled by the thickness of the polyimide layer and the surface energy of the substrate and so forth, as discussed above. The surface energy can be controlled by surface-processing the substrate with a silane coupling agent having functional groups containing fluorine to produce a water-repellant surface, for example.

A PSG continuous layer is then formed at 350° C. by an atmospheric CVD. The PSG layer is isotropically formed on the substrate and the resin layer. The thickness t of the continuous layer is 4.2 µm since the layer is deposited until flat portions between the spherical microstructures disappear. The CVD layer or PSG continuous layer is isotropically deposited, so that the radius of curvature of the CVD layer is the same as that of the reflow resin layer. The radius of curvature is 15 µm.

The thus-fabricated structure can be directly used as a convex microlens array. This microlens array also has the relationship of r=d/2=12.7 µm. Each microlens has an exactly-semispherical profile. Thus, a microlens array with a radius of curvature of 12.7 µm and without any optically-unusable regions can be obtained.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A method comprising the steps of:
   (a) forming a plurality of thermoplastic microstructures at common intervals on a wafer after processing a surface of the wafer to become a water-repellant surface using a silane coupling agent having a functional group containing fluorine;
   (b) causing the plurality of thermoplastic microstructures to undergo reflow to form an array of microstructures with a curved profile separated by flat portions, wherein each of the plurality of thermoplastic microstructures are never brought into contact at the time of reflow; and
   (c) forming a continuous layer of an approximately uniform thickness on the microstructures with a curved profile and on the flat portions until the flat portions between the microstructures disappear,
   wherein each of the microstructures with the curved profile is formed by controlling temperature and duration of heating during reflow such that an angle θ, on the microstructure side, between the surface of the wafer and a tangential plane of the microstructure at a location where the microstructure is in contact with the surface of the wafer is greater than 90 degrees,
   wherein the continuous layer is formed in a thickness that is equal to the height of the center of each of the microstructures with the curved profile from the surface of the flat portions,
   wherein each of the microstructures with the curved profile has a single flat surface as its entire bottom surface contacting the wafer, and
   wherein the microstructures with the curved profile comprise, at the same time, a first plurality of microstructures with a first curved profile having a first spacing between microstructures and a second plurality of microstructures with a second curved profile different from the first curved profile having a second spacing between microstructures different from the first spacing.

2. The method of claim 1, wherein said step (b) is performed by baking the wafer, and wherein said step (c) is performed by forming catalyst cores and performing electroless plating on the microstructures with a curved profile and on the flat portions.

3. The method of claim 2, further comprising the step of fabricating a mold by coating the plated layer with a remover agent to form a remover layer, performing electroplating to form an electroplated layer on the plated layer, and separating the electroplated layer by removing the remover layer to produce a mold.

4. The method of claim 3, further comprising the step of fabricating a microlens away by laying down a radiation hardening resin over the mold, placing a glass substrate of a support on the radiation hardening resin layer, exposing the radiation hardening resin layer to radiation through the glass substrate, and separating the glass substrate with the radiation hardening resin layer from the mold.

5. The method of claim 1, further comprising the step of forming a pattern for an alignment marker outside of a region of the plurality of thermoplastic microstructures, wherein said step (b) is performed by baking the wafer, and wherein said step (c) is performed by continuously layering an electrode layer, and performing electroplating using the electrode layer as a cathode to form an electroplated layer on the electrode layer until the flat portions between the microstructures disappear.

6. The method of claim 1, wherein in said step (a) at least a plurality of structures for an alignment marker are also formed in an area outside an area of the array of microstructures,
   wherein in said step (b), baking the wafer is performed, and
   wherein in said step (c), forming catalyst cores and electroless plating on the microstructures with a curved profile and on the flat portions are performed.

7. The method of claim 1, wherein said step (c) includes a step of forming the continuous layer by one of electroplating and electroless plating.

8. The method of claim 1, wherein said step (c) includes a step of forming the continuous layer by chemical vapor deposition (CVD).

9. The method of claim 1, wherein said step (c) includes a step of forming the continuous layer by vacuum evaporation.

10. The method of claim 1, wherein each of the microstructures formed in said step (b) has one of a spherical shape and a cylindrical shape.

11. The method of claim 1, wherein in said step (a) at least a structure for an alignment marker is also formed in an area outside an area of the away of microstructures.

12. The method of claim 1, wherein the microstructure away is a mold for a microstructure array.

13. The method of claim 12, wherein the mold for a microstructure array is a mold for a microlens array.

14. The method of claim 1, wherein the wafer, the microstructures with the curved profile, and the continuous layer are all formed of transparent material.

15. The method of claim 14, wherein the microstructure away is a microlens array.

16. The method of claim 1, wherein the microstructures with the curved profile comprise irregularly arranged microstructures.

17. The method of claim 1, wherein the angle is not less than 110 degrees.

18. The method of claim 1, wherein the angle is not less than 120 degrees.

19. The method of claim 1, wherein the angle is not less than 150 degrees.

20. The method of claim 1, wherein the following conditions are satisfied for each of the microstructures with the curved profile:
   l+t is greater than or equal to d/2, and
   l+h is greater than or equal to d/2
   where l is the radius of a microstructure,
   where h, which is $-l\cos\theta$, is the height between the surface of the substrate and the center of the microstructure,
   where t is the thickness of the continuous layer, and
   where d is the pitch of the away of the microstructures with the curved profile.

* * * * *